United States Patent
Stapleton et al.

(10) Patent No.: US 11,692,883 B2
(45) Date of Patent: Jul. 4, 2023

(54) FIBER OPTIC TEMPERATURE PROBE

(71) Applicant: Advanced Energy Industries, Inc., Fort Collins, CO (US)

(72) Inventors: Terry Stapleton, San Jose, CA (US); Jason Errett, Scotts Valley, CA (US)

(73) Assignee: Advanced Energy Industries, Inc., Denver, CO (US)

( * ) Notice: Subject to any disclaimer, the term of this patent is extended or adjusted under 35 U.S.C. 154(b) by 256 days.

(21) Appl. No.: 17/082,577

(22) Filed: Oct. 28, 2020

(65) Prior Publication Data

US 2022/0128417 A1    Apr. 28, 2022

(51) Int. Cl.
| | |
|---|---|
| *G01J 3/28* | (2006.01) |
| *G01K 11/3213* | (2021.01) |
| *G02B 6/26* | (2006.01) |
| *G01N 21/17* | (2006.01) |
| *G01N 21/63* | (2006.01) |
| *G01N 21/64* | (2006.01) |

(52) U.S. Cl.
CPC ......... *G01K 11/3213* (2013.01); *G01N 21/17* (2013.01); *G01N 21/63* (2013.01); *G01N 21/64* (2013.01); *G02B 6/264* (2013.01); *G01N 2201/08* (2013.01); *G01N 2201/088* (2013.01)

(58) Field of Classification Search
CPC .... G01K 11/3213; G01N 21/17; G01N 21/63; G01N 21/64; G01N 2201/08; G01N 2201/088; G02B 6/264; G01J 5/00; G01J 5/0821
See application file for complete search history.

(56) References Cited

U.S. PATENT DOCUMENTS

| | | | |
|---|---|---|---|
| 4,429,995 A | 2/1984 | Goulas | |
| 4,733,095 A | 3/1988 | Kurahashi et al. | |
| 5,419,277 A | 5/1995 | Urano et al. | |
| 6,186,004 B1 | 2/2001 | Kaduchak et al. | |
| 6,572,265 B1* | 6/2003 | Gotthold | G01J 5/0003 374/161 |
| 9,228,878 B2 | 1/2016 | Haw et al. | |
| 2001/0054376 A1 | 12/2001 | Miura et al. | |
| 2003/0116729 A1 | 6/2003 | Hanamoto et al. | |
| 2003/0149346 A1 | 8/2003 | Arnone et al. | |
| 2004/0233944 A1 | 11/2004 | Comstock et al. | |
| 2004/0258130 A1* | 12/2004 | Gotthold | G01J 5/0007 374/208 |
| 2005/0285060 A1 | 12/2005 | Haga et al. | |
| 2006/0002594 A1 | 1/2006 | Clarke et al. | |

(Continued)

OTHER PUBLICATIONS

Davidson et al., "Digital Imaging in Optical Microscopy", "Molecular Expression", 1998, pp. 4-5.

(Continued)

*Primary Examiner* — Abdullahi Nur
(74) *Attorney, Agent, or Firm* — Neugeboren O'Dowd PC

(57) ABSTRACT

A fiber optic temperature probe is disclosed. The fiber optic temperature probe includes a probe shaft containing an optical fiber. An optical temperature sensor element is coupled to the probe shaft and configured to be excited by light from the optical fiber and emit light back to the optical fiber. A thermally conductive plate is coupled to the probe shaft and interfaces with the optical temperature sensor element. Baffling extends from the probe shaft and surrounds the edges of the thermally conductive plate.

13 Claims, 4 Drawing Sheets

(56) References Cited

U.S. PATENT DOCUMENTS

| | | | |
|---|---|---|---|
| 2008/0285602 | A1 | 11/2008 | Nagai et al. |
| 2010/0044353 | A1 | 2/2010 | Olsen |
| 2010/0232459 | A1 | 9/2010 | Hashimoto et al. |
| 2011/0063628 | A1 | 3/2011 | Xie et al. |
| 2011/0085573 | A1 | 4/2011 | Bartels et al. |
| 2014/0036942 | A1 | 2/2014 | Vander et al. |
| 2020/0393307 | A1* | 12/2020 | Ichihashi ............... G01K 11/32 |
| 2021/0080328 | A1* | 3/2021 | Liu .................... G01K 11/3213 |

OTHER PUBLICATIONS

Jones, Chris, "Non-contact displacement sensor technologies", "Power in Motion", Oct. 2008, pp. 12-13, Publisher: Microepsilon, Published in: GB.

Letokhov et al., "Advances in Laser Physics", 2000, p. 63, Publisher: Harwood Academic Publishers.

Wikipedia, "Operation Chastise", Webpage found at http://en.wikipedia.org/wiki/Operation_Chastise downloaded Jan. 17, 2013, last modified Jan. 13, 2013, p. 15, Publisher: Wikipedia Foundation, Inc., Published in: US.

Pastorius, "Triangulation Sensors", 2001, pp. 5-6, Publisher: Instrument Soc Amer.

Selby, "Standard Mathematical Tables", 1968, p. 179, Publisher: The Chemical Rubber Co.

Winkler, Erich, "New laser triangulation sensors: Blue light for glowing materials", "On Focus: Sensors", Mar. 2011, p. 14, Publisher: Microepsilon DE.

\* cited by examiner

FIBER OPTIC TEMPERATURE PROBE

BACKGROUND

Field

The present disclosed embodiments relate generally to temperature sensing devices, and more specifically to optical temperature sensing devices.

Background

Fiber optic thermometers hold unique advantages over other temperature measuring devices, particularly when measuring temperatures in the presence of strong electromagnetic fields. Electronic components exposed to such fields, such as those of a thermocouple or other electronic temperature measurement device, may behave erratically and cause inaccurate temperature measurements. Fiber optic thermometers or temperature probes, on the other hand, may be constructed almost entirely of non-conductive materials, making them suitable for applications with strong electromagnetic fields.

Typically, fiber optic temperature probes have a temperature sensitive light-emitting material positioned at one end of a fiber optic cable and measure the properties of the light transmitted from the light-emitting material to the other end of the fiber optic cable in order to determine the temperature of the light-emitting material. In some cases, the fiber optic cable can run to an area outside of a strong electromagnetic field environment for devices containing electronic components to measure the transmitted light without exposure to significant electromagnetic interference. Some remote sensing temperature measurement devices, such as pyrometers, may be used under such strong electromagnetic conditions; however, fiber optic temperature probes are more capable of accurately measuring lower temperatures than pyrometers.

For more accurate temperature measurement of a test article, the temperature sensitive light-emitting material at the end of the fiber optic probe is thermally coupled to the test article, while thermal coupling to the surrounding environment is kept to a minimum. Enhancing the thermal coupling of the light-emitting material and the test article allows for their temperatures to more closely match with reduced thermal interference from the surrounding environment. As a result, most fiber optic temperature probes are designed to contact the test article, often with some bonding or affixing mechanism to ensure uniform contact force, or to be immersed in a thermally conductive fluid; however, some applications require no contact or light contact force with the test article.

Fiber optic temperature probes designed for no contact measurements, often "close non-contact" measurements taken a few millimeters from the test article surface, and light contact measurements, often with an unbonded, unaffixed probe resting on the test article surface, are presented with a variety of problems, particularly in low pressure environments with low thermal conductivity. For example, a test article with a surface hotter than its surrounding environment may generate some turbulent convention, which may significantly influence the local thermal environment and, thereby, the measured temperature of a probe taking close non-contact or light contact measurements. Additionally, any fluid flow present in the surrounding environment may significantly affect the local thermal environment of a close non-contact or light contact probe measurement and inhibit the thermal coupling of the light-emitting material of a probe and the test article surface. Also, variations in placement location on the test article surface between close non-contact or light contact probe measurements may hinder the repeatability of temperature measurements due to variations in temperature associated with location on the test article surface being introduced.

There is therefore a need in the art for a new fiber optic temperature probe design that addresses some of the current shortcomings, particularly those involved in taking close non-contact and light contact temperature measurements of a test article surface.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some aspects of the present disclosure may be characterized as a fiber optic temperature probe apparatus that includes a probe shaft containing an optical fiber. An optical temperature sensor element may be coupled to the tip of the probe shaft and may be configured to be excited by light from the optical fiber and emit light back to the optical fiber. A thermally conductive plate may be coupled to the tip of the probe shaft and may be configured to interface with the optical temperature sensor element. Baffling may extend from the tip of the probe shaft and surround the edges of the thermally conductive plate.

Other aspects of the present disclosure may be characterized as a fiber optic temperature probe apparatus that includes a probe shaft containing an optical fiber. An optical temperature sensor element may be coupled to the tip of the probe shaft. A thermally conductive plate may be coupled to the tip of the probe shaft and may be configured to interface with the optical temperature sensor element. The fiber optic temperature probe apparatus may include a means for thermally isolating the optical temperature sensor element and thermally conductive plate from the exterior environment as well as a means for thermally exposing the thermally conductive plate to a test article. The fiber optic temperature probe apparatus may also include a means for exciting the optical temperature sensor element with light from the optical fiber and a means for measuring the light emitted by the excited optical temperature sensor element.

DETAILED DESCRIPTION

Figure 1:
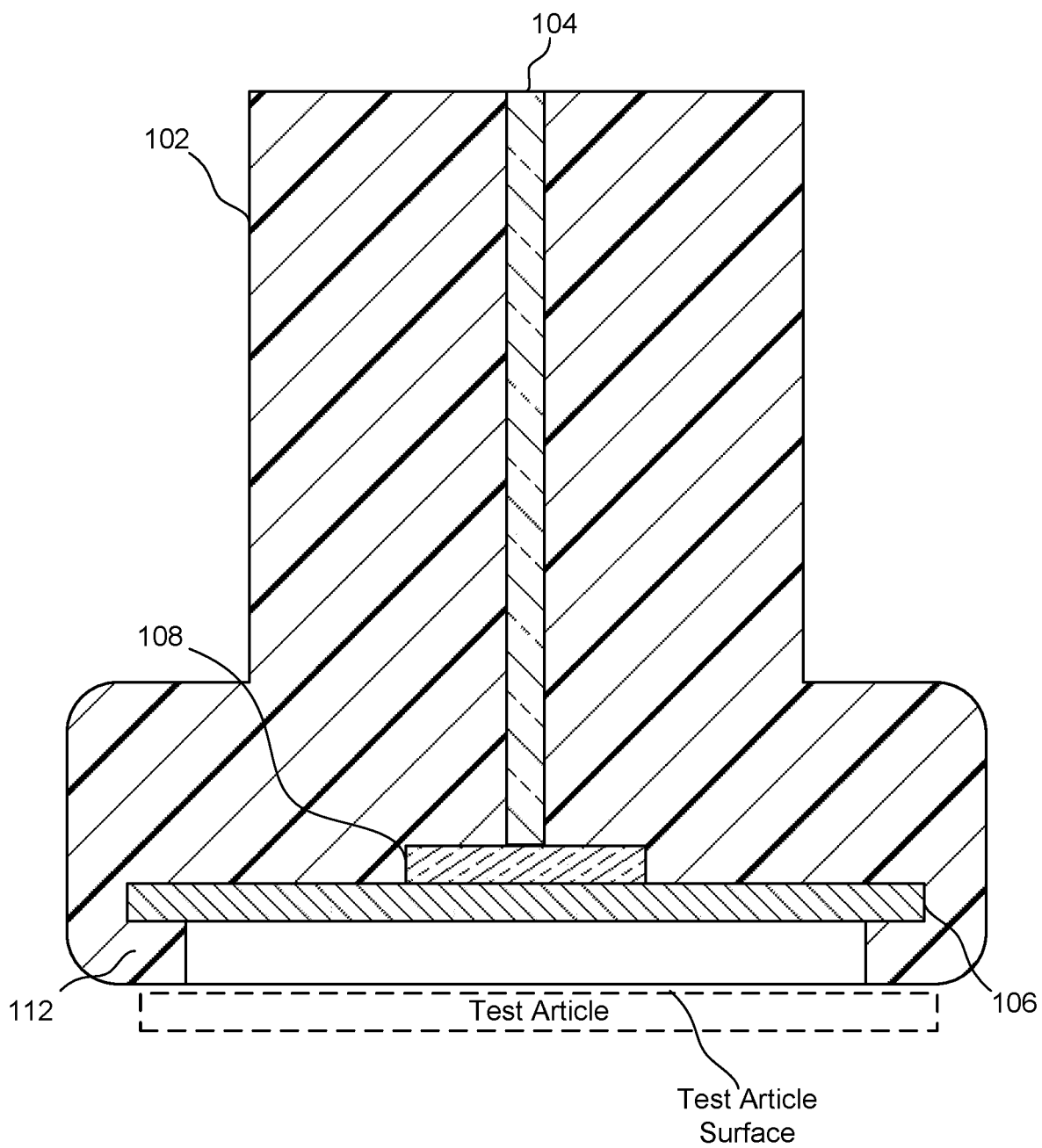
FIG. 1 illustrates a cross-sectional view of an exemplary embodiment of a fiber optic temperature probe tip with baffling.

The word "exemplary" is used herein to mean "serving as an example, instance, or illustration." Any embodiment described herein as "exemplary" is not necessarily to be construed as preferred or advantageous over other embodiments.

Some embodiments of the present disclosure may comprise a fiber optic temperature probe configured to take temperature measurements of a test article surface. The fiber optic temperature probe may comprise a probe shaft containing an optical fiber, or fiber optic cable. An optical temperature sensing mechanism may be coupled to the probe shaft and optical fiber. Possible optical temperature sensing mechanisms may include, for example, phosphorescent or fluorescent thermal sensors, which may be excited with a pulse of light via the optical fiber. Various means for thermally exposing one or more components of the optical temperature sensing mechanism to the exterior of the probe shaft, and thus a test article surface, may be implemented. For example, a hole in the probe shaft or a thermally conductive material passing into the probe shaft may thermally connect and expose the one or more components of the optical temperature sensing mechanism to the probe exterior. The thermal exposure of the one or more components of the optical temperature sensing mechanism to the exterior environment may allow for the optical temperature sensing mechanism to thermally couple to a test article surface.

While the one or more components of the optical temperature sensing mechanism may be thermally exposed to the exterior environment, various means for thermally isolating the one or more component of the optical temperature sensing mechanism from portions of the exterior environment may be implemented. For example, the one or more components of the optical temperature sensing mechanism may be housed within a low thermal conductivity material within the probe shaft. Additionally, or alternatively, low thermal conductivity baffling may extend from the probe shaft to create a more localized exterior environment to which the components of the optical temperature sensing mechanism may be thermally exposed. Such baffling may inhibit turbulent convection and fluid flow during close non-contact and light contact temperature measurements of a test article surface, potentially improving the thermal coupling of the optical temperature sensing mechanism and test article surface and, thereby, increasing the accuracy of the temperature measurements.

In some embodiments, low thermal conductivity baffling may extend from the probe shaft to form a cavity. The cavity may be coated with a reflective material, which may provide a means for redirecting thermal radiation from, for example, a test article surface towards the optical temperature sensing mechanism. Consequently, more thermal radiation emitted by a test article surface may potentially be absorbed by the optical temperature sensing mechanism, rather than being absorbed by the cavity walls. Such a redirection of thermal radiation may improve the thermal coupling of the optical temperature sensing mechanism and the test article surface allowing for an increase in temperature measurement accuracy, particularly in low pressure environments.

In some embodiments, the optical temperature sensing mechanism may be coupled to the tip of the probe shaft with baffling extending from the tip of the probe shaft. Some embodiments may have an optical temperature sensing mechanism and baffling that is at an angle with the probe shaft, such as 30°, 45°, or 90°. The tip of the optical fiber may be angled and polished to interface with the angled optical temperature sensing mechanism. Angling the optical temperature sensing mechanism and baffling may enable for easier access to test article surfaces in certain applications.

In some embodiments, the optical temperature sensing mechanism may comprise an optical temperature sensor element coupled to the tip of the probe shaft. The optical temperature sensor element may be realized, for example, by a phosphorescent or fluorescent thermal sensor; however, other optical temperature sensor elements and mechanisms known in the art may be utilized. The optical temperature sensor element may be positioned and configured to be excited by light from the optical fiber and to emit light back to the optical fiber that is indicative of a temperature that the sensor element is exposed to. Means for exciting the optical temperature sensor element with light from the optical fiber may include, for example, sending a pulse of light from a light source configured to emit light into the optical fiber in the direction of the optical temperature sensor element. The light from the light source may travel through the optical fiber and excite the optical temperature sensor element, which may consequently emit light back into the optical fiber. Means for measuring the light emitted by the excited optical temperature sensor element may include, for example, configuring a photodiode to receive light from the optical fiber from the direction of the optical temperature sensor element. The intensity or decay time, for example, of the light emitted by the excited optical temperature sensor element may be used to determine the temperature of the optical temperature sensor element.

In some embodiments, the optical temperature sensing mechanism may further comprise a thermally conductive plate coupled to the tip of the probe shaft configured to interface with the optical temperature sensor element. The thermally conductive plate may be positioned to prevent light from the exterior environment from interacting with, and potentially exciting, the optical temperature sensor element as well as the optical fiber. The potential reduction in exterior light interference with the optical temperature sensing mechanism may enable for an improvement in overall temperature measurement accuracy.

In some embodiments, the thermally conductive plate may additionally be configured to be thermally exposed to both the exterior environment and the optical temperature sensor element, which enables for the thermally conductive plate to thermally couple with a test article surface as well as the optical temperature sensor element. In some embodiments, the thermally conductive plate may be positioned between the test article surface and the optical temperature sensor element so that the thermally conductive plate may absorb thermal energy from the test article surface and transfer that energy to the optical temperature sensor element. Larger thermally conductive plates may enable for a faster transfer of thermal energy, reducing the time needed to take a temperature measurement; however, larger thermally conductive plates may have a larger sample area on the test article surface.

In some embodiments, the thermally conductive plate may have a high emissivity coating, which may improve thermal radiative coupling and, thereby, overall thermal coupling between the thermally conductive plate and the exterior environment, such as a test article surface. Improvements in thermal coupling between the thermally conductive plate and test article surface may enhance the thermal coupling of the optical temperature sensor element and the test article surface, potentially increasing temperature measurement accuracy.

In some embodiments, baffling may extend from the tip of the probe shaft and surround the edges of the thermally conductive plate. Thus, the thermally conductive plate may be seated in the baffling extending from the tip of the probe shaft. In other embodiments, the baffling may extend from the tip of the probe shaft and surround or encompass the entire optical temperature sensing mechanism. In other embodiments, the optical temperature sensing mechanism may be contained within the probe shaft, and the baffling may surround or encompass a hole in the probe shaft that exposes the optical temperature sensing mechanism to the exterior environment.

In some embodiments, the baffling may extend to form a cavity adjacent to the thermally conductive plate. Optionally, this cavity may be coated with a reflective material, which may provide a means for redirecting thermal radiation from, for example, a test article surface towards the thermally conductive plate. Consequently, more thermal radiation emitted by a test article surface may potentially be absorbed by the thermally conductive plate, rather than being absorbed by the cavity walls. Such a redirection of thermal radiation may improve the thermal coupling of the optical temperature sensing mechanism and the test article surface allowing for an increase in temperature measurement accuracy, particularly in low pressure environments.

In some embodiments, the optical temperature sensor element, thermally conductive plate, and baffling may be at an angle with the probe shaft, such as 30°, 45°, or 90°, and the tip of the optical fiber may be angled and polished to interface with the optical temperature sensor element. Angling the optical temperature sensor element, thermally conductive plate, and baffling may enable for easier access to test article surfaces in certain applications.

Referring now to the drawings, FIG. 1 illustrates a cross-sectional view of an exemplary embodiment of a fiber optic temperature probe tip with baffling 112. The probe shaft 102 may contain an optical fiber 104, which extends to interface with an optical temperature sensing mechanism. The optical temperature sensing mechanism shown comprises a thermally conductive plate 106 and an optical temperature sensor element 108. The optical temperature sensor element 108 may, for example, be realized by a disk-shaped phosphorescent or fluorescent thermal sensor, which may contain a photoluminescent material or element; however, other optical temperature sensor elements and mechanisms known in the art having different geometries may be utilized without departing from the spirit or scope of this disclosure. Baffling 112 may extend from the tip of the probe shaft 102 and surround the edges of the thermally conductive plate 106.

In some embodiments, the probe shaft 102 may, for example, be realized by an elongated cylinder with a narrow diameter, such as 3-5 mm; however, other embodiments may utilize alternative geometries and diameters. The probe shaft 102 may also be constructed of a variety of materials. For example, the probe shaft 102 may include, or consist of, a rigid polymer, such as polyether ether ketone (PEEK), a ceramic, or a more pliable polymer. Rigid materials may allow the probe shaft 102 to maintain its structure and provide stability to the optical temperature sensing mechanism, while more pliable materials may enable the probe shaft 102 to deform and access hard-to-reach places.

The thermally conductive plate 106 may be coupled to the tip of the probe shaft 102 and be configured to be thermally exposed to the exterior environment in one direction. For example, a hole, such as the hole at the center of the baffling 112, or a thermally conductive material passing into the probe shaft 102 may provide such a means for thermally exposing the thermally conductive plate 106 to the exterior environment, such as a test article. A surface of the thermally conductive plate 106 not exposed to the exterior environment may also thermally interface with the optical temperature sensor element 108. Thus, the thermally conductive plate 106 may thermally couple with an object in the exterior environment, such as a test article surface, as well as the optical temperature sensor element 108, potentially allowing for the transfer of thermal energy. The high thermal conductivity and large diameter of the thermally conductive plate 106 may also enable for a faster transfer of thermal energy between a test article surface and the optical temperature sensor element 108, potentially improving the overall temperature measurement speed. In some embodiments, positioning the thermally conductive plate 106 between a surface of the optical temperature sensor element 108 and the exterior environment may prevent light from the exterior environment from interacting with, and potentially exciting, the optical temperature sensor element 108 as well as the optical fiber 104, potentially enabling for an improvement in overall temperature measurement accuracy.

In some embodiments, the thermally conductive plate 106 may, for example, be realized by material with high thermal conductivity, such as aluminum or other metal, shaped into a disk, rectangle, or other geometric shape. In some embodiments, the thermally conductive plate 106 may, optionally, have a high emissivity coating, potentially applied using, for example, electroplating, painting, or physical vapor deposition (PVD). The high emissivity coating may improve thermal radiative coupling and, thereby, overall thermal coupling between the thermally conductive plate 106 and a test article surface. Improvements in thermal coupling between the thermally conductive plate 106 and test article surface may enhance the thermal coupling of the optical temperature sensor element 108 and the test article surface, potentially increasing temperature measurement accuracy.

In other embodiments, the thermally conductive plate 106 may not be included in the optical temperature sensing mechanism. In such embodiments, the optical temperature sensor element 108 may be directly thermally exposed to the exterior environment in one direction, while the probe shaft 102 and baffling 112 may surround and thermally isolate the optical temperature sensor element 108 from the exterior environment in the other directions.

The optical temperature sensor element 108 may also be coupled to the tip of the probe shaft 102, while being positioned and configured to be excited by light from the optical fiber 104 and to emit light back to the optical fiber 104. The optical fiber 104 may directly interface with a first surface of the optical temperature sensor element 108, which may be seated in a recess of the tip of the probe shaft 102, and the thermally conductive plate 106 may thermally interface with a second surface of the optical temperature sensor element 108. In other embodiments, the optical fiber 104 may interface with the optical temperature sensor element 108 by sending and/or receiving light through a gap or cavity between the optical fiber 104 and the optical temperature sensor element 108. Means for exciting the optical temperature sensor element 108 with light from the optical fiber 104 may include, for example, sending a pulse of light from a light source configured to emit light into the optical fiber 104 in the direction of the optical temperature sensor element 108. The light from the light source may travel through the optical fiber 104 and excite the optical temperature sensor element 108, which may consequently emit light back into the optical fiber 104. Means for measuring the light emitted by the excited optical temperature sensor element 108 may include, for example, configuring a photodiode to receive light from the optical fiber 104 from the direction of the optical temperature sensor element 108. The intensity or decay time, for example, of the light emitted by the excited optical temperature sensor element 108 may be used to determine the temperature of the optical temperature sensor element 108.

The baffling 112 may extend from the tip of the probe shaft 102 and surround the edges of the thermally conductive plate 106. Thus, the thermally conductive plate 106 may be seated in the baffling 112 extending from the tip of the probe shaft 102. The baffling 112 may be cylindrical with a greater diameter than the probe shaft 102 and may extend along the surface of the thermally conductive plate 106 to form a lip; however, in other variations the shape, angle, diameter, and length of the baffling 112 may vary without departing from the spirit or scope of this disclosure. For example, in other embodiments, the baffling 112 may have no lip over the thermally conductive plate 106 or may extend from the tip of the probe shaft 102 in a flared or tapered configuration. In other variations, the baffling 112 may extend from the tip of the probe shaft 102 and surround or encompass the entire optical temperature sensing mechanism. In yet other variations, the optical temperature sensing mechanism may be contained within the probe shaft 102, and the baffling 112 may surround or encompass a hole in the probe shaft 102 that exposes the optical temperature sensing mechanism to the exterior environment.

The baffling 112 may be constructed of a material with low thermal conductivity, such as a polymer or ceramic, which may provide a means for thermally isolating the optical temperature sensor element 108 and thermally conductive plate 106 from the exterior environment in all directions not facing the test article surface. Additionally, the baffling 112 may provide another means for thermally isolating the optical temperature sensor element 108 and thermally conductive plate 106 by potentially inhibiting problematic turbulent convection and fluid flow during close non-contact and light contact temperature measurements of a test article surface. This inhibition of turbulent convection and fluid flow may potentially improve the thermal coupling of the optical temperature sensor element 108 and test article surface and, thereby, increase the accuracy of the temperature measurements.

Figure 2:
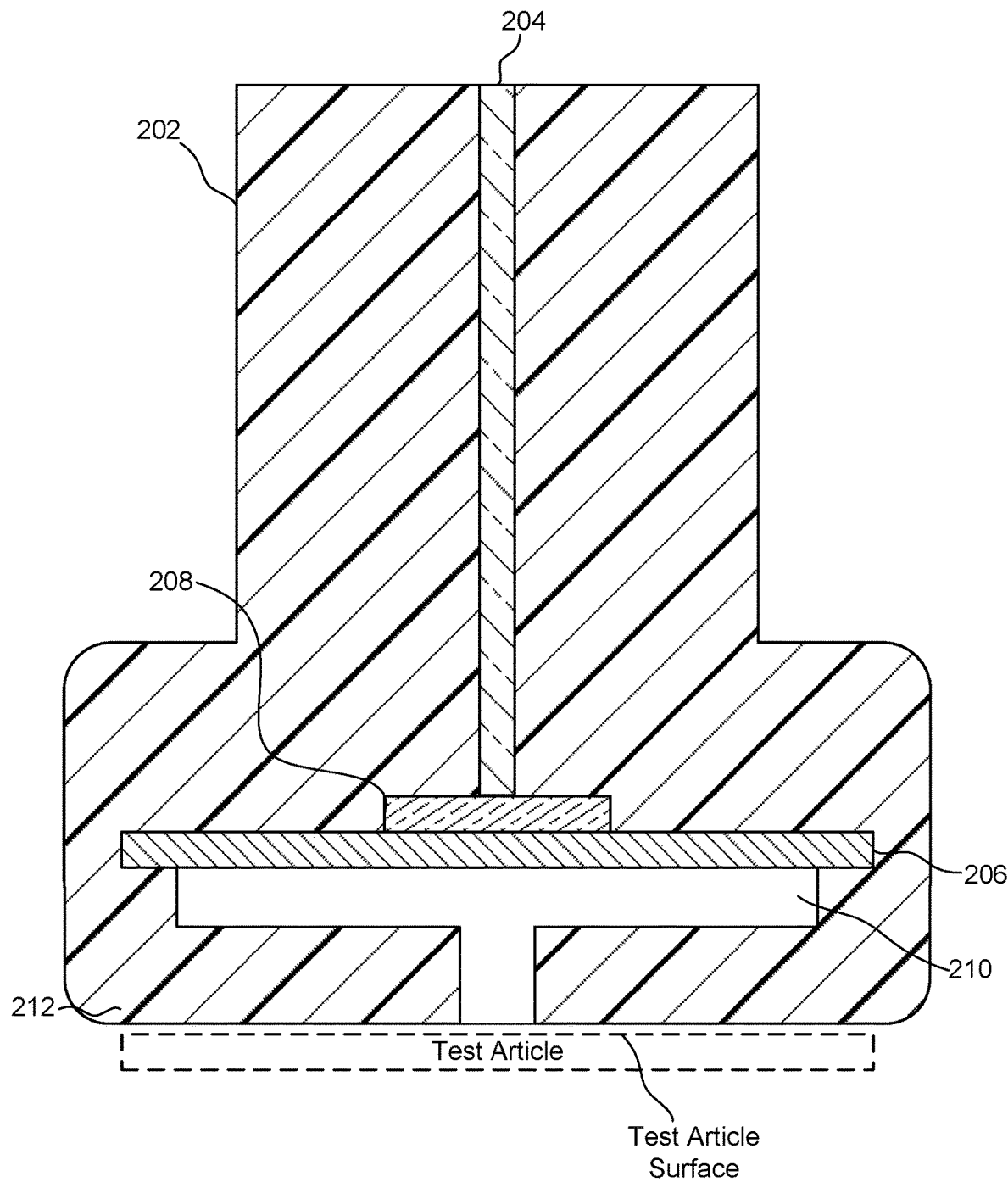
FIG. 2 illustrates a cross-sectional view of an exemplary embodiment of a fiber optic temperature probe tip with baffling that extends to form a cavity.

Referring now to FIG. 2, illustrated is a cross-sectional view of an exemplary embodiment of a fiber optic temperature probe tip with baffling 212 that extends to form a cavity 210. The probe shaft 202 may contain an optical fiber 204, which extends to interface with an optical temperature sensing mechanism. The optical temperature sensing mechanism shown comprises a thermally conductive plate 206 and an optical temperature sensor element 208. The optical temperature sensor element 208 may, for example, be realized by a disk-shaped phosphorescent or fluorescent thermal sensor, which may contain a photoluminescent material or element; however, other optical temperature sensor elements and mechanisms known in the art having different geometries may be utilized without departing from the spirit or scope of this disclosure. Baffling 212 may extend from the tip of the probe shaft 202 and surround the edges of the thermally conductive plate 206. The baffling 212 may further extend to form a cavity 210 adjacent to the thermally conductive plate 206. Optionally, the cavity 210 may be coated with a reflective material to form a reflective cavity, which may provide a means for redirecting thermal radiation from, for example, the test article surface towards the thermally conductive plate 206. Consequently, more thermal radiation emitted by a test article surface may potentially be absorbed by the thermally conductive plate 206, rather than being absorbed by the cavity 210 walls. Such a redirection of thermal radiation may improve the thermal coupling of the thermally conductive plate 206 and the test article surface allowing for an increase in temperature measurement accuracy, particularly in low pressure environments.

In some implementations, the probe shaft 202 may, for example, be realized by an elongated cylinder with a narrow diameter, such as 3-5 mm; however, other implementations may utilize alternative geometries and diameters. The probe shaft 202 may also be constructed of a variety of materials. For example, the probe shaft 202 may include, or consist of, a rigid polymer, such as PEEK, a ceramic, or a more pliable polymer. Rigid materials may allow the probe shaft 202 to maintain its structure and provide stability to the optical temperature sensing mechanism, while more pliable materials may enable the probe shaft 202 to deform and access hard-to-reach places.

The thermally conductive plate 206 may be coupled to the tip of the probe shaft 202 and be configured to be thermally exposed to the exterior environment in one direction. For example, a hole, such as the hole at the center of the baffling 212, or a thermally conductive material passing into the probe shaft may provide such a means for thermally exposing the thermally conductive plate 206 to the exterior environment, such as a test article. A surface of the thermally conductive plate 206 not exposed to the exterior environment may also thermally interface with the optical temperature sensor element 208. Thus, the thermally conductive plate 206 may thermally couple with an object in the exterior environment, such as a test article surface, as well as the optical temperature sensor element 208, potentially allowing for the transfer of thermal energy. The high thermal conductivity and large diameter of the thermally conductive plate 206 may also enable for a faster transfer of thermal energy between a test article surface and the optical temperature sensor element 208, potentially improving the overall temperature measurement speed. In some implementations, positioning the thermally conductive plate 206 between a surface of the optical temperature sensor element 208 and the exterior environment may prevent light from the exterior environment from interacting with, and potentially exciting, the optical temperature sensor element 208 as well as the optical fiber 204, potentially enabling for an improvement in overall temperature measurement accuracy.

In some variations, the thermally conductive plate 206 may, for example, be realized by material with high thermal conductivity, such as aluminum or other metal, shaped into a disk, rectangle, or other geometric shape. In some variations, the thermally conductive plate 206 may, optionally, have a high emissivity coating, potentially applied using, for example, electroplating, painting, or PVD. The high emissivity coating may improve thermal radiative coupling and, thereby, overall thermal coupling between the thermally conductive plate 206 and a test article surface. Improvements in thermal coupling between the thermally conductive plate 206 and test article surface may enhance the thermal coupling of the optical temperature sensor element 208 and the test article surface, potentially increasing temperature measurement accuracy.

In other variations, the thermally conductive plate 206 may not be included in the optical temperature sensing mechanism. In such embodiments, the optical temperature sensor element 208 may be directly thermally exposed to the exterior environment in one direction, while the probe shaft 202 and baffling 212 may surround and thermally isolate the optical temperature sensor element 208 from the exterior environment in the other directions.

The optical temperature sensor element 208 may also be coupled to the tip of the probe shaft 202, while being positioned and configured to be excited by light from the optical fiber 204 and to emit light back to the optical fiber 204 that is indicative of temperature. The optical fiber 204 may directly interface with a first surface of the optical temperature sensor element 208, which may be seated in a recess of the tip of the probe shaft 202, and the thermally conductive plate 206 may thermally interface with a second surface of the optical temperature sensor element 208. In other variations, the optical fiber 204 may interface with the optical temperature sensor element 208 by sending and/or receiving light through a gap or cavity between the optical fiber 204 and the optical temperature sensor element 208. Means for exciting the optical temperature sensor element 208 with light from the optical fiber 204 may include, for example, sending a pulse of light from a light source configured to emit light into the optical fiber 204 in the direction of the optical temperature sensor element 208. The light from the light source may travel through the optical fiber 204 and excite the optical temperature sensor element 208, which may consequently emit light back into the optical fiber 204. Means for measuring the light emitted by the excited optical temperature sensor element 208 may include, for example, configuring a photodiode to receive light from the optical fiber 204 from the direction of the optical temperature sensor element 208. The intensity or decay time, for example, of the light emitted by the excited optical temperature sensor element 208 may be used to determine the temperature of the optical temperature sensor element 208.

The baffling 212 may extend from the tip of the probe shaft 202 and surround the edges of the thermally conductive plate 206. Thus, the thermally conductive plate 206 may be seated in the baffling 212 extending from the tip of the probe shaft 202. The baffling 212 may extend beyond the edges of the thermally conductive plate 206 and turn at an angle, such as 90°, towards the midline of the probe shaft 202 to form a cavity 210 with a small opening to the exterior environment. The baffling 212 that forms the walls of the cavity 210 may potentially reduce the sampled area of a test article surface by limiting the area of the thermally conductive plate 206 exposed to the exterior environment. Additionally, variations with a smaller opening to the exterior environment may limit thermal conduction and increase the influence of thermal radiation, which may enable for more stable and consistent temperature measurements in low pressure environments, such as a vacuum.

The baffling 212 may be roughly cylindrical with a greater diameter than the probe shaft 202; however, in other embodiments the shape, angle, diameter, and length of the baffling 212 may vary without departing from the spirit or scope of this disclosure. For example, in other embodiments, the baffling 212 may extend from the tip of the probe shaft 202 in a flared or tapered configuration or may extend towards the midline of the probe shaft 202 in a curved manner, rather than a straight line. In other embodiments, the baffling 212 may extend from the tip of the probe shaft 202 and surround or encompass the entire optical temperature sensing mechanism. In yet other embodiments, the optical temperature sensing mechanism may be contained within the probe shaft 202, and the baffling 212 may surround or encompass a hole in the probe shaft 202 that exposes the optical temperature sensing mechanism to the exterior environment.

The baffling 212 may be constructed of a material with low thermal conductivity, such as a polymer or ceramic, which may provide a means for thermally isolating the optical temperature sensor element 208 and thermally conductive plate 206 from the exterior environment in all directions not facing the test article surface. Additionally, the baffling 212 may provide another means for thermally isolating the optical temperature sensor element 208 and thermally conductive plate 206 by potentially inhibiting problematic turbulent convection and fluid flow during close non-contact and light contact temperature measurements of a test article surface. This inhibition of turbulent convection and fluid flow may potentially improve the thermal coupling of the optical temperature sensor element 208 and test article surface and, thereby, increase the accuracy of the temperature measurements.

Figure 3:
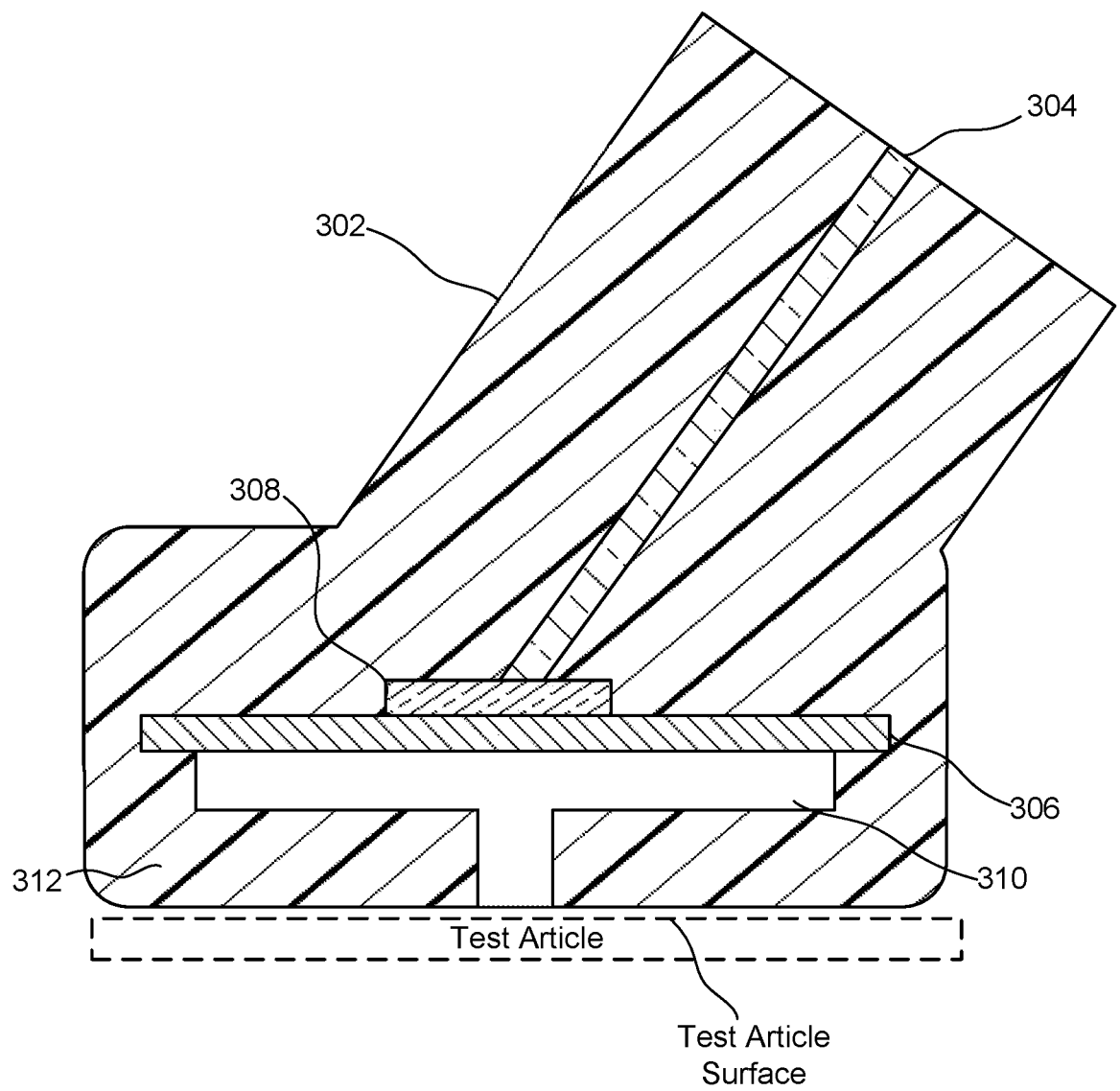
FIG. 3 illustrates a cross-sectional view of an exemplary embodiment of a fiber optic temperature probe with an angled tip and baffling that extends to form a cavity.

Referring now to FIG. 3, illustrated is a cross-sectional view of an exemplary embodiment of a fiber optic temperature probe tip with an angled tip and baffling 312 that extends to form a cavity 310. The probe shaft 302 may contain an optical fiber 304, which extends to interface with an optical temperature sensing mechanism that may be at an angle, such as 30° or 45°, or any angle therebetween, with the probe shaft 302. The end of the optical fiber 304 may be angled and polished to accommodate for the angled interface with the optical temperature sensing mechanism. The optical temperature sensing mechanism shown comprises a thermally conductive plate 306 and an optical temperature sensor element 308, which may be shifted, in this case laterally, to compensate for the potential tilting of light beams produced by the angled end of the optical fiber 304. The optical temperature sensor element 308 may, for example, be realized by a disk-shaped phosphorescent or fluorescent thermal sensor, which may contain a photoluminescent material or element; however, other optical temperature sensor elements and mechanisms known in the art having different geometries may be utilized without departing from the spirit or scope of this disclosure. Baffling 312 may extend from the tip of the probe shaft 302 at an angle with the probe shaft 302 matching the angle of the optical temperature sensing mechanism and the probe shaft 302 and surround the edges of the thermally conductive plate 306. Thus, the optical temperature sensor element 308, thermally conductive plate 306, and baffling 312 may all be at an angle with the probe shaft 302. This angled configuration of the optical temperature sensing mechanism and baffling 312 may enable for the fiber optic temperature probe to access test article surfaces in narrower spaces. The baffling 312 may further extend to form a cavity 310 adjacent to the thermally conductive plate 306. Optionally, the cavity 310 may be coated with a reflective material, which may provide a means for redirecting thermal radiation from, for example, the test article surface towards the thermally conductive plate 306. Consequently, more thermal radiation emitted by a test article surface may potentially be absorbed by the thermally conductive plate 306, rather than being absorbed by the cavity 310 walls. Such a redirection of thermal radiation may improve the thermal coupling of the thermally conductive plate 306 and the test article surface allowing for an increase in temperature measurement accuracy, particularly in low pressure environments.

In some embodiments, the probe shaft 302 may, for example, be realized by an elongated cylinder with a narrow diameter, such as 3-5 mm; however, other embodiments may utilize alternative geometries and diameters. For example the probe shafts in the embodiments described herein may have a diameter that is substantially similar to the baffles of the various embodiments. The probe shaft 302 may also be constructed of a variety of materials. For example, the probe shaft 302 may include or consist of a rigid polymer, such as PEEK, a ceramic, or a more pliable polymer. Rigid materials may allow the probe shaft 302 to maintain its structure and provide stability to the optical temperature sensing mechanism, while more pliable materials may enable the probe shaft 302 to deform and access hard-to-reach places.

The thermally conductive plate 306 may be coupled to the tip of the probe shaft 302 at an angle with the probe shaft 302 and be configured to be thermally exposed to the exterior environment in one direction. For example, a hole, such as the hole at the center of the baffling 312, or a thermally conductive material passing into the probe shaft may provide such a means for thermally exposing the thermally conductive plate 306 to the exterior environment, such as a test article. A surface of the thermally conductive plate 306 not exposed to the exterior environment may also thermally interface with the optical temperature sensor element 308. Thus, the thermally conductive plate 306 may be enabled to thermally couple with an object in the exterior environment, such as a test article surface, as well as the optical temperature sensor element 308, potentially allowing for the transfer of thermal energy. The high thermal conductivity and large diameter of the thermally conductive plate 306 may also enable for a faster transfer of thermal energy between a test article surface and the optical temperature sensor element 308, potentially improving the overall temperature measurement speed. In some embodiments, positioning the thermally conductive plate 306 between a surface of the optical temperature sensor element 308 and the exterior environment may prevent light from the exterior environment from interacting with, and potentially exciting, the optical temperature sensor element 308 as well as the optical fiber 304, potentially enabling for an improvement in overall temperature measurement accuracy.

In some variations, the thermally conductive plate 306 may, for example, be realized by material with high thermal conductivity, such as aluminum or other metal, shaped into a disk, rectangle, or other geometric shape. And in some variations, the thermally conductive plate 306 may, optionally, have a high emissivity coating, potentially applied using, for example, electroplating, painting, or PVD. The high emissivity coating may improve thermal radiative coupling and, thereby, overall thermal coupling between the thermally conductive plate 306 and a test article surface. Improvements in thermal coupling between the thermally conductive plate 306 and test article surface may enhance the thermal coupling of the optical temperature sensor element 308 and the test article surface, potentially increasing temperature measurement accuracy.

In other variations, the thermally conductive plate 306 may not be included in the optical temperature sensing mechanism. In such variations, the optical temperature sensor element 308 may be directly thermally exposed to the exterior environment in one direction, while the probe shaft 302 and baffling 312 may surround and thermally isolate the optical temperature sensor element 308 from the exterior environment in the other directions.

The optical temperature sensor element 308 may also be coupled to the tip of the probe shaft 302 at an angle with the probe shaft 302, while being positioned and configured to be excited by light from the optical fiber 304 and to emit light back to the optical fiber 304. The optical fiber 304 may directly interface with a first surface of the optical temperature sensor element 308, which may be seated in an angled recess of the tip of the probe shaft 302, and the thermally conductive plate 306 may thermally interface with a second surface of the optical temperature sensor element 308. In other variations, the optical fiber 304 may interface with the optical temperature sensor element 308 by sending and/or receiving light through a gap or cavity between the optical fiber 304 and the optical temperature sensor element 308. Means for exciting the optical temperature sensor element 308 with light from the optical fiber 304 may include, for example, sending a pulse of light from a light source configured to emit light into the optical fiber 304 in the direction of the optical temperature sensor element 308. The light from the light source may travel through the optical fiber 304 and excite the optical temperature sensor element 308, which may consequently emit light back into the optical fiber 304. Means for measuring the light emitted by the excited optical temperature sensor element 308 may include, for example, configuring a photodiode to receive light from the optical fiber 304 from the direction of the optical temperature sensor element 308. The intensity or decay time, for example, of the light emitted by the excited optical temperature sensor element 308 may be used to determine the temperature of the optical temperature sensor element 308.

The baffling 312 may extend from the tip of the probe shaft 302 at an angle with the probe shaft 302 and surround the edges of the thermally conductive plate 306. Thus, the thermally conductive plate 306 may be seated in the baffling 312 extending at an angle from the tip of the probe shaft 302. The baffling 312 may extend beyond the edges of the thermally conductive plate 306 and turn to parallel the thermally conductive plate 306 forming a cavity 310 with a small opening to the exterior environment. The baffling 312 that forms the walls of the cavity 310 may potentially reduce the sampled area of a test article surface by limiting the area of the thermally conductive plate 306 exposed to the exterior environment. Additionally, embodiments with a smaller opening to the exterior environment may limit thermal conduction and increase the influence of thermal radiation, which may enable for more stable and consistent temperature measurements in low pressure environments, such as a vacuum.

In other variations, the baffling 312 may, as in the FIG. 1 exemplary embodiment, simply extend along the surface of the thermally conductive plate 306 to form a lip, rather than further extending to form the cavity 310. Such embodiments may enable for more rapid temperature measurements with a greater area of the thermally conductive plate 306 exposed to the exterior environment, while potentially maintaining temperature measurement consistency in normal or high-pressure environments with more stable thermal conduction.

In some embodiments, the baffling 312 may be roughly cylindrical with a greater diameter than the probe shaft 302; however, in other embodiments the shape, angle, diameter, and length of the baffling 312 may vary without departing from the spirit or scope of this disclosure. For example, in other embodiments, the baffling 312 may extend from the tip of the probe shaft 302 in a flared or tapered configuration or may extend roughly parallel to the thermally conductive plate 306 in a curved manner, rather than a straight line. In other embodiments, the baffling 312 may extend from the tip of the probe shaft 302 at an angle with the probe shaft 302 and surround or encompass the entire optical temperature sensing mechanism. In other embodiments, the optical temperature sensing mechanism may be contained within the probe shaft 302, and the baffling 312 may surround or encompass a hole in the probe shaft 302 that exposes the optical temperature sensing mechanism to the exterior environment.

The baffling 312 may be constructed of a material with low thermal conductivity, such as a polymer or ceramic, which may provide a means for thermally isolating the optical temperature sensor element 308 and thermally conductive plate 306 from the exterior environment in all directions not facing the test article surface. Additionally, the baffling 312 may provide another means for thermally isolating the optical temperature sensor element 308 and thermally conductive plate 306 by potentially inhibiting problematic turbulent convection and fluid flow during close non-contact and light contact temperature measurements of a test article surface. This inhibition of turbulent convection and fluid flow may potentially improve the thermal coupling of the optical temperature sensor element 308 and test article surface and, thereby, increase the accuracy of the temperature measurements.

Figure 4:
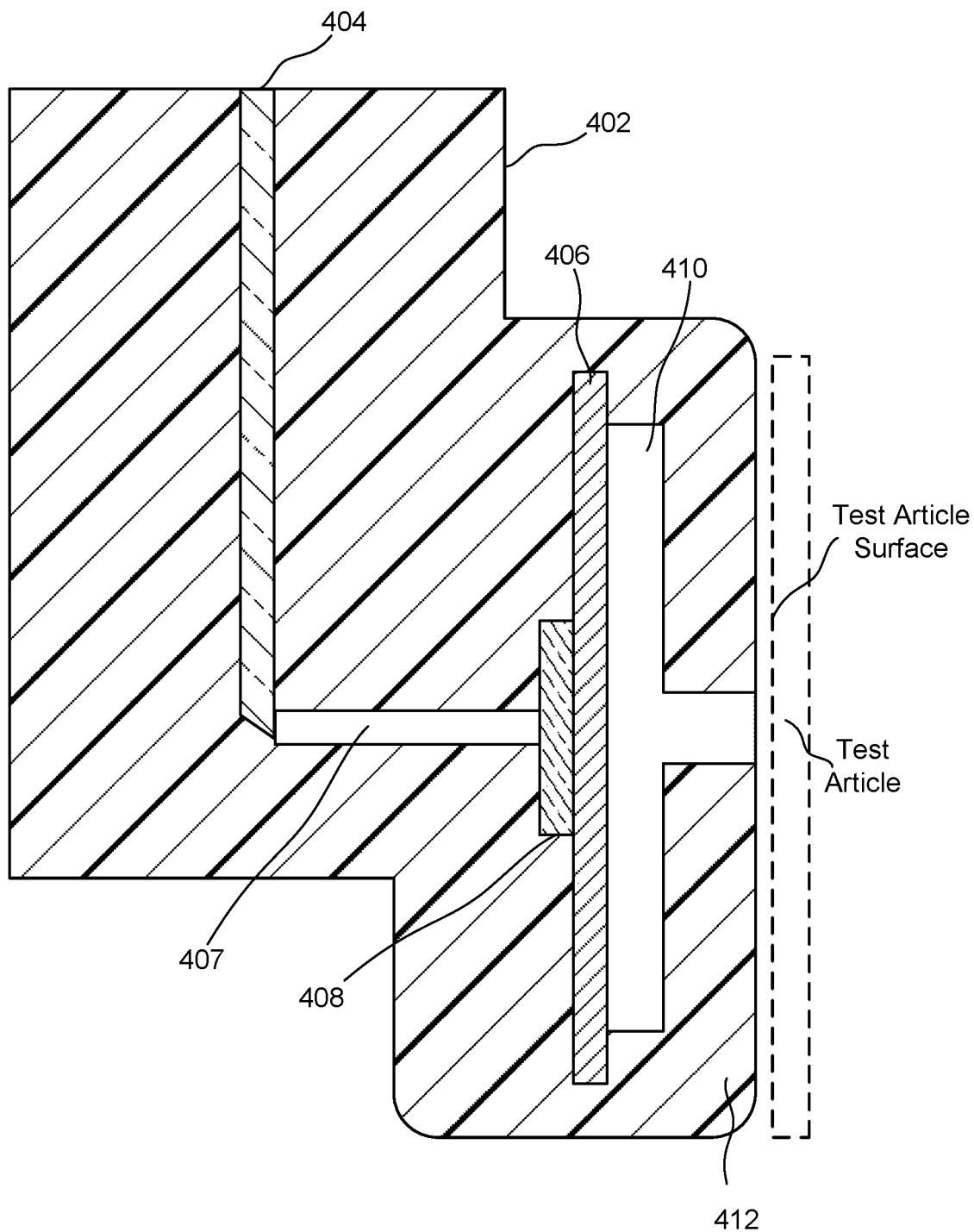
FIG. 4 illustrates a cross-sectional view of an exemplary embodiment of a fiber optic temperature probe with a right-angled tip and baffling that extends to form a cavity.

Referring now to FIG. 4, illustrated is a cross-sectional view of an exemplary embodiment of a fiber optic temperature probe tip with a right-angled tip and baffling 412 that extends to form a cavity 410. The probe shaft 402 may contain an optical fiber 404, which extends to interface, via an optical cavity 407, with an optical temperature sensing mechanism that may be at an 90° angle, or right angle, with the probe shaft 402. The end of the optical fiber 404 may be polished at a 45° angle to direct light at a right angle to and from the optical temperature sensing mechanism positioned at the opposing end of the optical cavity 407. In other embodiments, the optical fiber 404 and the optical temperature sensing mechanism may be configured to directly interface without an optical cavity 407. The optical temperature sensing mechanism shown comprises a thermally conductive plate 406 and an optical temperature sensor element 408. The optical temperature sensor element 408 may, for example, be realized by a disk-shaped phosphorescent or fluorescent thermal sensor, which may contain a photoluminescent material or element; however, other optical temperature sensor elements and mechanisms known in the art having different geometries may be utilized without departing from the spirit or scope of this disclosure. Baffling 412 may extend from the tip of the probe shaft 402 at a right angle with the probe shaft 402, matching the angle of the optical temperature sensing mechanism, and may surround the edges of the thermally conductive plate 406. Thus, the optical temperature sensor element 408, thermally conductive plate 406, and baffling 412 may all be at a right angle with the probe shaft 402. This right-angle configuration of the optical temperature sensing mechanism and baffling 412 may enable for the fiber optic temperature probe to access test article surfaces in tighter spaces. The baffling 412 may further extend to form a cavity 410 adjacent to the thermally conductive plate 406. Optionally, the cavity 410 may be coated with a reflective material, which may provide a means for redirecting thermal radiation from, for example, the test article surface towards the thermally conductive plate 406. Consequently, more thermal radiation emitted by a test article surface may potentially be absorbed by the thermally conductive plate 406, rather than being absorbed by the cavity 410 walls. Such a redirection of thermal radiation may improve the thermal coupling of the thermally conductive plate 406 and the test article surface allowing for an increase in temperature measurement accuracy, particularly in low pressure environments.

In some variations, the probe shaft 402 may, for example, be realized by an elongated cylinder with a narrow diameter, such as 3-5 mm; however, other variations may utilize alternative geometries and diameters. The probe shaft 402 may also be constructed of a variety of materials. For example, the probe shaft 402 may include, or consist of, a rigid polymer, such as PEEK, a ceramic, or a more pliable polymer. Rigid materials may allow the probe shaft 402 to maintain its structure and provide stability to the optical temperature sensing mechanism, while more pliable materials may enable the probe shaft 402 to deform and access hard-to-reach places.

The thermally conductive plate 406 may be coupled to the tip of the probe shaft 402 at a right angle with the probe shaft 402 and be configured to be thermally exposed to the exterior environment in one direction. For example, a hole, such as the hole at the center of the baffling 412, or a thermally conductive material passing into the probe shaft may provide such a means for thermally exposing the thermally conductive plate 406 to the exterior environment, such as a test article. A surface of the thermally conductive plate 406 not exposed to the exterior environment may also thermally interface with the optical temperature sensor element 408. Thus, the thermally conductive plate 406 may thermally couple with an object in the exterior environment, such as a test article surface, as well as the optical temperature sensor element 408, potentially allowing for the transfer of thermal energy. The high thermal conductivity and large diameter of the thermally conductive plate 406 may also enable for a faster transfer of thermal energy between a test article surface and the optical temperature sensor element 408, potentially improving the overall temperature measurement speed. In some variations, positioning the thermally conductive plate 406 between a surface of the optical temperature sensor element 408 and the exterior environment may prevent light from the exterior environment from interacting with, and potentially exciting, the optical temperature sensor element 408 as well as the optical fiber 404, potentially enabling for an improvement in overall temperature measurement accuracy.

In some implementations, the thermally conductive plate 406 may, for example, be realized by material with high thermal conductivity, such as aluminum or other metal, shaped into a disk, rectangle, or other geometric shape. In some embodiments, the thermally conductive plate 406 may, optionally, have a high emissivity coating, potentially applied using, for example, electroplating, painting, or PVD. The high emissivity coating may improve thermal radiative coupling and, thereby, overall thermal coupling between the thermally conductive plate 406 and a test article surface. Improvements in thermal coupling between the thermally conductive plate 406 and test article surface may enhance the thermal coupling of the optical temperature sensor element 408 and the test article surface, potentially increasing temperature measurement accuracy.

In other embodiments, the thermally conductive plate 406 may not be included in the optical temperature sensing mechanism. In such embodiments, the optical temperature sensor element 408 may be directly thermally exposed to the exterior environment in one direction, while the probe shaft 402 and baffling 412 may surround and thermally isolate the optical temperature sensor element 408 from the exterior environment in the other directions.

The optical temperature sensor element 408 may also be coupled to the tip of the probe shaft 402 at a right angle with the probe shaft 402, while being positioned and configured to be excited by light from the optical fiber 404 and to emit light back to the optical fiber 404. The optical fiber 404 may send and receive light through the optical cavity 407 to interface with a first surface of the optical temperature sensor element 408, which may be seated in a recess of the probe shaft 402 tip that is at a right angle with the probe shaft 402. The thermally conductive plate 406 may thermally interface with a second surface of the optical temperature sensor element 408. Means for exciting the optical temperature sensor element 408 with light from the optical fiber 404 may include, for example, sending a pulse of light from a light source configured to emit light into the optical fiber 404 in the direction of the optical temperature sensor element 408. The light from the light source may travel through the optical fiber 404 and excite the optical temperature sensor element 408, which may consequently emit light back into the optical fiber 404. Means for measuring the light emitted by the excited optical temperature sensor element 408 may include, for example, configuring a photodiode to receive light from the optical fiber 404 from the direction of the optical temperature sensor element 408. The intensity or decay time, for example, of the light emitted by the excited optical temperature sensor element 408 may be used to determine the temperature of the optical temperature sensor element 408.

The baffling 412 may extend from the tip of the probe shaft 402 at a right angle to the probe shaft 402 and surround the edges of the thermally conductive plate 406. Thus, the thermally conductive plate 406 may be seated in the baffling 412 extending at a right angle from the tip of the probe shaft 402. The baffling 412 may extend beyond the edges of the thermally conductive plate 406 and turn to parallel the thermally conductive plate 406 forming a cavity 410 with a small opening to the exterior environment. The baffling 412 that forms the walls of the cavity 410 may potentially reduce the sampled area of a test article surface by limiting the area of the thermally conductive plate 406 exposed to the exterior environment. Additionally, embodiments with a smaller opening to the exterior environment may limit thermal conduction and increase the influence of thermal radiation, which may enable for more stable and consistent temperature measurements in low pressure environments, such as a vacuum.

In other embodiments, the baffling 412 may, as in the FIG. 1 exemplary embodiment, simply extend along the surface of the thermally conductive plate 406 to form a lip, rather than further extending to form the cavity 410. Such embodiments may enable for more rapid temperature measurements with a greater area of the thermally conductive plate 406 exposed to the exterior environment, while potentially maintaining temperature measurement consistency in normal or high-pressure environments with more stable thermal conduction.

In some embodiments, the baffling 412 may be roughly cylindrical with a greater diameter than the probe shaft 402; however, in other embodiments the shape, angle, diameter, and length of the baffling 412 may vary without departing from the spirit or scope of this disclosure. For example, in other variations, the baffling 412 may extend from the tip of the probe shaft 402 in a flared or tapered configuration or may extend roughly parallel to the thermally conductive plate 406 in a curved manner, rather than a straight line. In yet other variations, the baffling 412 may extend from the tip of the probe shaft 402 at a right angle with the probe shaft 402 and surround or encompass the entire optical temperature sensing mechanism. In other embodiments, the optical temperature sensing mechanism may be contained within the probe shaft 402, and the baffling 412 may surround or encompass a hole in the probe shaft 402 that exposes the optical temperature sensing mechanism to the exterior environment.

The baffling 412 may be constructed of a material with low thermal conductivity, such as a polymer or ceramic, which may provide a means for thermally isolating the optical temperature sensor element 408 and thermally conductive plate 406 from the exterior environment in all directions not facing the test article surface. Additionally, the baffling 412 may provide another means for thermally isolating the optical temperature sensor element 408 and thermally conductive plate 406 by potentially inhibiting problematic turbulent convection and fluid flow during close non-contact and light contact temperature measurements of a test article surface. This inhibition of turbulent convection and fluid flow may potentially improve the thermal coupling of the optical temperature sensor element 408 and test article surface and, thereby, increase the accuracy of the temperature measurements.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A fiber optic temperature probe comprising:
    a probe shaft containing an optical fiber;
    an optical temperature sensor element coupled to a tip of the probe shaft configured to be excited by light from the optical fiber and emit light back to the optical fiber;
    a thermally conductive plate coupled to the tip of the probe shaft configured to interface with the optical temperature sensor element; and
    baffling extending from the tip of the probe shaft and surrounding edges of the thermally conductive plate, wherein the baffling extends to form a cavity adjacent to the thermally conductive plate at an opposite side of the thermally conductive plate from the optical temperature sensor to prevent the thermally conducting plate from contacting a test article.

2. The fiber optic temperature probe of claim 1, wherein the thermally conductive plate comprises a high emissivity coating.

3. The fiber optic temperature probe of claim 1, wherein the cavity is coated with a reflective material.

4. The fiber optic temperature probe of claim 1, wherein:
    the tip of the optical fiber is angled; and
    the optical temperature sensor element, thermally conductive plate, and baffling are at an angle with the probe shaft.

5. A fiber optic temperature probe comprising:
    a probe shaft containing an optical fiber;
    an optical temperature sensor element coupled to a tip of the probe shaft;
    a thermally conductive plate coupled to a tip of the probe shaft configured to interface with the optical temperature sensor element;
    means for thermally isolating the optical temperature sensor element and thermally conductive plate from an exterior environment;

means for thermally exposing the thermally conductive plate to a test article via a cavity;

means for exciting the optical temperature sensor element with light from the optical fiber; and means for measuring the light emitted by the excited optical temperature sensor element.

6. The fiber optic temperature probe of claim 5, wherein the thermally conductive plate comprises a high emissivity coating.

7. The fiber optic temperature probe of claim 5, further comprising:

means for redirecting thermal radiation from the test article towards the thermally conductive plate.

8. The fiber optic temperature probe of claim 5, wherein:

the tip of the optical fiber is angled; and the optical temperature sensor element and thermally conductive plate are at an angle with the probe shaft.

9. A fiber optic temperature probe comprising:

a probe shaft containing an optical fiber;

an optical temperature sensor element coupled to a tip of the probe shaft configured to be excited by light from the optical fiber and emit light back to the optical fiber that is indicative of temperature; and baffling extending from the tip of the probe shaft, the baffling surrounding all faces of the optical temperature sensor element except a face of the optical temperature sensor element that is exposed to a thermally conductive plate that is exposed to a cavity, the cavity formed by the baffling on a side of the thermally conductive plate that is opposite from the optical temperature sensor element.

10. The fiber optic temperature probe of claim 9, wherein the optical temperature sensor comprises at least one of a fluorescent thermal sensor and a phosphorescent sensor.

11. The fiber optic temperature probe of claim 9, wherein the thermally conductive plate has a high emissivity coating.

12. The fiber optic temperature probe of claim 9, wherein the cavity is coated with a reflective material.

13. The fiber optic temperature probe of claim 9, wherein:

the tip of the optical fiber is angled; and the optical temperature sensor element, thermally conductive plate, and baffling are at an angle with the probe shaft.

* * * * *